(12) United States Patent
Nakatani et al.

(10) Patent No.: US 8,769,951 B2
(45) Date of Patent: Jul. 8, 2014

(54) GEOTHERMAL POWER-GENERATION SYSTEM

(75) Inventors: Hiromi Nakatani, Tokyo (JP); Jin Kato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 162 days.

(21) Appl. No.: 13/171,847

(22) Filed: Jun. 29, 2011

(65) Prior Publication Data

US 2012/0000198 A1 Jan. 5, 2012

(30) Foreign Application Priority Data

Jun. 30, 2010 (JP) ................. 2010-150517

(51) Int. Cl.
- F03G 7/00 (2006.01)
- F24J 3/08 (2006.01)
- F28D 7/00 (2006.01)
- F28F 9/00 (2006.01)

(52) U.S. Cl.
USPC .............................. 60/641.2; 165/45; 165/162

(58) Field of Classification Search
USPC ......... 60/641.1–641.5; 165/45, 162, 145, 158
See application file for complete search history.

(56) References Cited

U.S. PATENT DOCUMENTS

| | | | | |
|---|---|---|---|---|
| 4,040,480 A * | 8/1977 | Richards | | 166/57 |
| 4,142,108 A | 2/1979 | Matthews | | |
| 4,776,169 A * | 10/1988 | Coles, Jr. | | 60/641.2 |
| 5,816,314 A * | 10/1998 | Wiggs et al. | | 165/45 |
| 6,259,165 B1 * | 7/2001 | Brewington | | 290/1 A |
| 7,128,156 B2 * | 10/2006 | McClung, III | | 166/302 |
| 7,578,140 B1 * | 8/2009 | Wiggs | | 62/260 |
| 7,832,220 B1 * | 11/2010 | Wiggs | | 62/77 |
| 2004/0035110 A1 * | 2/2004 | Hildebrand | | 60/641.4 |
| 2009/0071631 A1 * | 3/2009 | Ippoushi et al. | | 165/104.24 |
| 2009/0139700 A1 * | 6/2009 | Bignon | | 165/154 |
| 2009/0320474 A1 * | 12/2009 | Giles | | 60/641.2 |
| 2009/0321040 A1 * | 12/2009 | Poitras | | 165/45 |

FOREIGN PATENT DOCUMENTS

| | | |
|---|---|---|
| CN | 101634281 A | 1/2010 |
| JP | 60-42358 B2 | 9/1985 |
| JP | 61-502412 A | 10/1986 |
| JP | 01-117990 A | 5/1989 |
| JP | 7-507370 A | 8/1995 |
| JP | 08-135561 A | 5/1996 |
| JP | 09-112407 A | 5/1997 |
| JP | 3468885 B2 | 9/2003 |

(Continued)

OTHER PUBLICATIONS

An Australian Notice of Acceptance, dated Jun. 20, 2012 issued in AU Application No. 2011203142.

(Continued)

*Primary Examiner* — Thomas Denion
*Assistant Examiner* — Brian Inacay
(74) *Attorney, Agent, or Firm* — Lowe Hauptman & Ham, LLP

(57) ABSTRACT

[Problem to be solved] To achieve a reduction in facility costs in a geothermal power-generation system.
[Solution] To provide a compressor 11 that compresses air, a heating device 14 that heats compressed air compressed by the compressor 11 by geothermal heat, a turbine 12 that obtains a rotational force by heated compressed air heated by the heating device 14, and a generator 13 that generates power by the rotational force inputted from the turbine 12.

5 Claims, 3 Drawing Sheets

(56) References Cited

FOREIGN PATENT DOCUMENTS

| | | | |
|---|---|---|---|
| JP | 2004510920 | A | 4/2004 |
| WO | 86-00124 | A1 | 1/1986 |
| WO | 93/24754 | A2 | 12/1993 |

OTHER PUBLICATIONS

Office Action mailed Dec. 17, 2013, corresponds to Japanese patent application No. 2010-150517.

* cited by examiner

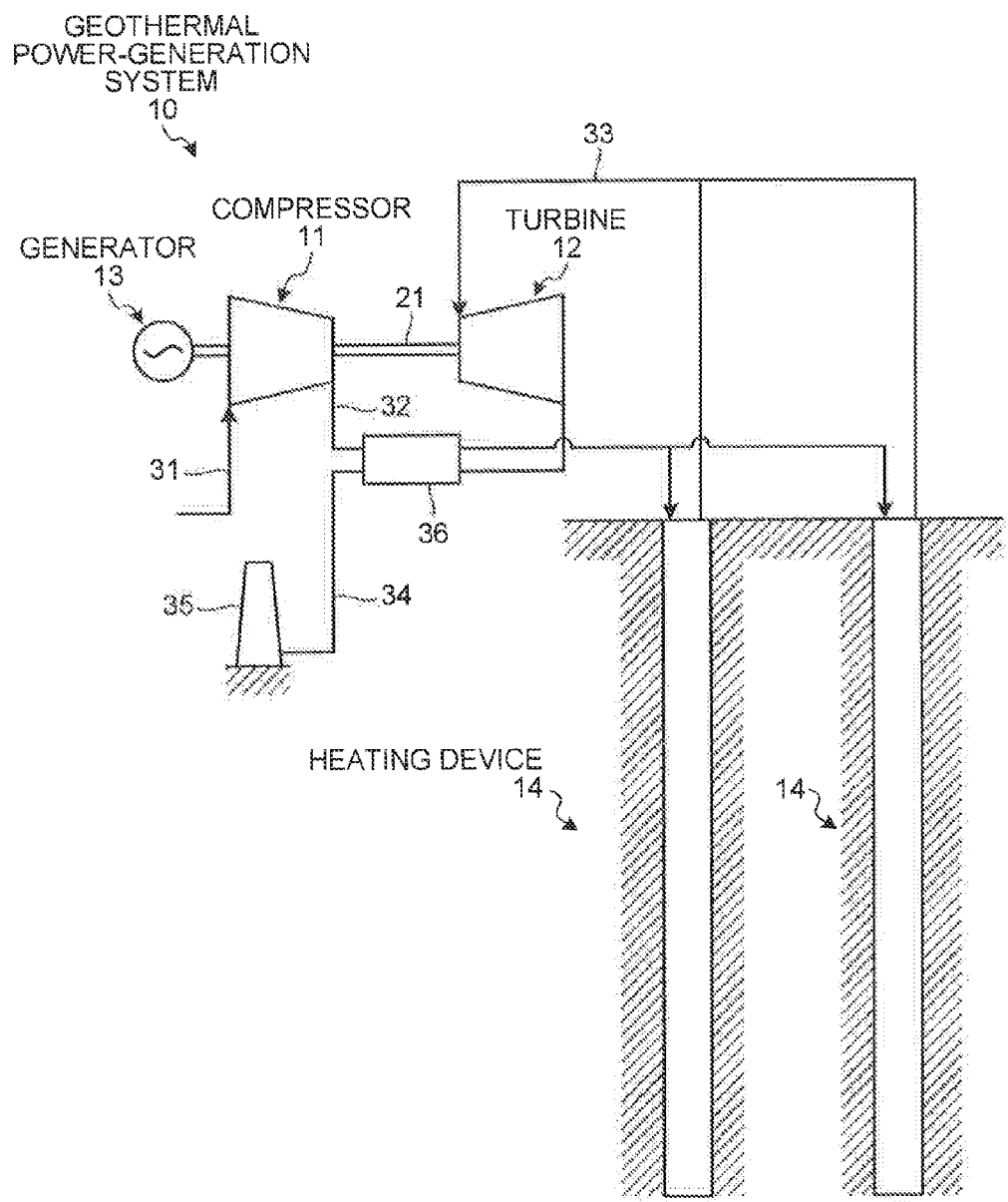

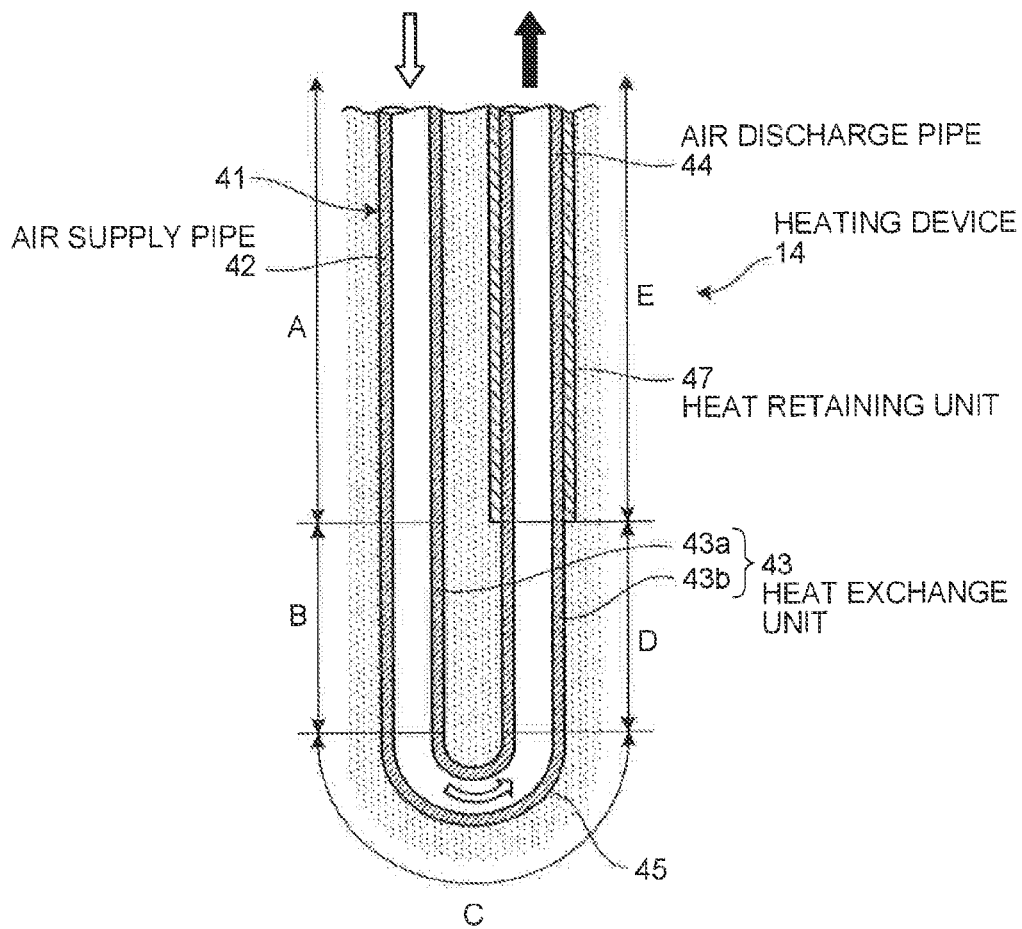
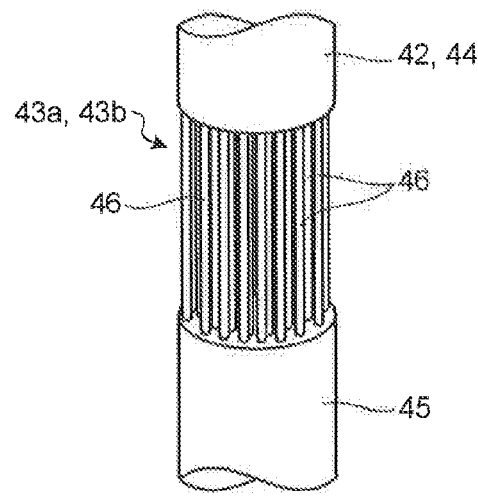

GEOTHERMAL POWER-GENERATION SYSTEM

TECHNICAL FIELD

The present invention relates to a geothermal power-generation system that drives and rotates a turbine utilizing geothermal heat to generate power.

BACKGROUND ART

In normal power generation facilities using geothermal heat, the ground is excavated to a predetermined depth and a geothermal fluid in which vapor and hot water coexist under a high pressure in a deep underground is emitted to the ground. The geothermal fluid is separated into vapor and hot water by a vapor-water separator, and this separated vapor drives and rotates a turbine for power generation.

However, the hot water and vapor taken out from a deep underground usually contain gas components such as carbon dioxide ($CO_2$), hydrogen sulfide ($H_2S$), ammonia ($NH_3$), and methane ($CH_4$). Sodium chloride (NaCl), boron (B), arsenic (As) and mercury (Hg), for example, are contained as chemical components depending on a temperature. When these gas components and chemical components are released on the ground, they can be a cause of pollution. Accordingly, after a turbine is driven and rotated, it is not preferable to release the used vapor into the atmosphere in view of the global environment. Furthermore, impurities need to be processed, resulting in increasing facility costs as well as causing the facilities to be complicated. To prevent depletion of the geothermal fluid, the separated hot water and used vapor need to be cooled and returned to the underground, and this also results in increasing facility costs.

In view of the above problems, there has been proposed an apparatus of supplying water from the ground to the underground, heating this water by geothermal heat to take it as vapor, and driving and rotating a turbine by the vapor for power generation, instead of taking out a geothermal fluid (vapor) in a deep underground to the ground. Such a power generation apparatus is described in Patent Literatures 1 and 2, for example.

According to the apparatuses described in these Patent Literatures, a sealed piping in which a water intake pipe is placed so as to surround a water supply pipe is provided in the ground, water supplied through the water supply pipe is heated by geothermal heat at a lower heat exchange unit, the heated fluid is taken out to the ground through the water intake pipe, and vapor is separated therefrom by a vapor-water separator to drive and rotate a turbine.

CITATION LIST

Patent Literatures

[PTL 1] JPA S61-502412A
[PTL 2] JP H09-112407A

SUMMARY OF INVENTION

Technical Problem

According to the conventional power generation apparatuses mentioned above, water (vapor) is used as an operating fluid, this water is supplied in the ground and heated by geothermal heat, the heated fluid is taken out to the ground, and vapor is separated to drive and rotate a turbine. However, it is no advantageous cost-wise to use water as the operating fluid. That is, when water is utilized, water processing facilities are required and vapor-water separators are also required, and thus facility costs are increased. Further, when water is used, there are problems such that an oxide film is generated at an inner surface of the piping, or calcium and magnesium in water are deposited and deposition is generated accordingly.

The present invention been achieved in view of the above problems, and an object of the present invention is to provide a geothermal power-generation system that can reduce facility costs.

Solution to Problem

According to an aspect of the present invention, a geothermal power-generation system includes: a compressor that compresses air; a heating device that heats compressed air compressed by the compressor by geothermal heat; a turbine that obtains a rotational force by heated compressed air heated by the heating device; and a generator that generates power by a rotational force inputted from the turbine.

Accordingly, the compressed air compressed by the compressor is heated by the heating device using geothermal heat, and the heated compressed air is supplied to the turbine and thus a rotational force is obtained. The generator generates power by the rotational force inputted from the turbine. That is, by using air as an operating fluid, processing facilities are not required and the piping is hardly deteriorated, resulting in reduced facility costs.

Advantageously, in the geothermal power-generation system, the heating device includes an air supply pipe embedded in a ground to a predetermined depth from a surface of the ground, a heat exchange unit that is connected to a distal end of the air supply pipe and performs heat exchange between air and geothermal heat, and an air discharge pipe that is connected to the heat exchange unit and embedded in the ground from the surface of the ground.

Accordingly, air passes through the air supply pipe to be supplied to the heat exchange unit, and in the heat exchange unit, heat exchange is performed between air and geothermal heat, so that heated air is generated. The heated air passes through the air discharge pipe to be returned to the surface of the ground, and thus the heated air can be generated by a simple configuration.

Advantageously, in the geothermal power-generation system, the air supply pipe and the air discharge pipe are placed in the ground so as to be spaced away from each other.

Accordingly, by preventing heat exchange between heated air that passes through the air discharge pipe to be returned to the surface of the ground and air that passes through the air supply pipe to be supplied in the ground by geological layers, heated air with an appropriate temperature can be supplied to the surface of the ground. Further, heat insulation between the air supply pipe and the air discharge pipe can be realized without providing any other components.

Advantageously, in the geothermal power-generation system, a heat retaining unit is provided, at outside of the air discharge pipe.

Accordingly, heated air heated by the heat exchange unit passes through the air discharge pipe heat-retained by the heat retaining unit to be supplied to the surface of the ground. Therefore, a decrease in the temperature of the heated air can be prevented and thus heated air with an appropriate temperature can be maintained.

Advantageously, in the geothermal power-generation system, the heat exchange unit includes a first heat exchange unit that is connected to a lower end of the air supply pipe and a second heat exchange unit that is connected to a lower end of the air discharge pipe, and the lower end of the first heat exchange unit is connected to the lower end of the second heat exchange unit by a U-shaped connecting piping.

Accordingly, the heat exchange unit can be formed in a linear portion, and thus the configuration can be simplified and manufacturing costs and installation costs can be reduced.

Advantageous Effects of Invention

According to the geothermal power-generation system of the present invention, compressed air compressed by a compressor installed on the ground is sent to a piping in the ground, guided to a high temperature part in the ground, and the compressed air flowing in the piping is heated by geothermal heat. The compressed air thermally inflated in the ground is guided to the ground while heat-retained and introduced into a turbine for power generation. Therefore, air can be used as an operating fluid. Further, because impurities from the ground are not taken in, processing facilities for toxic substances in the ground are not required. Furthermore, because a heat medium is air, influences of deterioration of the piping can be minimized, the usage rate of geothermal power generation plants can be improved, and facility costs and installation costs can be reduced.

BRIEF DESCRIPTION OF DRAWINGS

FIG. 1 is a schematic configuration diagram of a geothermal power-generation system according to an embodiment of the present invention.

FIG. 2 is a schematic diagram of a heating device in the geothermal power-generation system according to the embodiment.

FIG. 3 is a schematic diagram of a heat exchange unit in the heating device according to the embodiment.

DESCRIPTION OF EMBODIMENTS

Exemplary embodiments of a geothermal power-generation system according to the present invention will be explained below in detail with reference to the accompanying drawings. The present invention is not limited to the embodiments.

Embodiment

Figure 4:
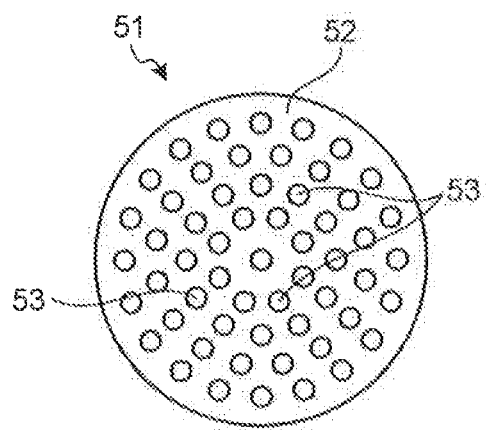
FIG. 4 is a schematic diagram of a modification of the heat exchange unit in the heating device according to the embodiment.
Figure 5:
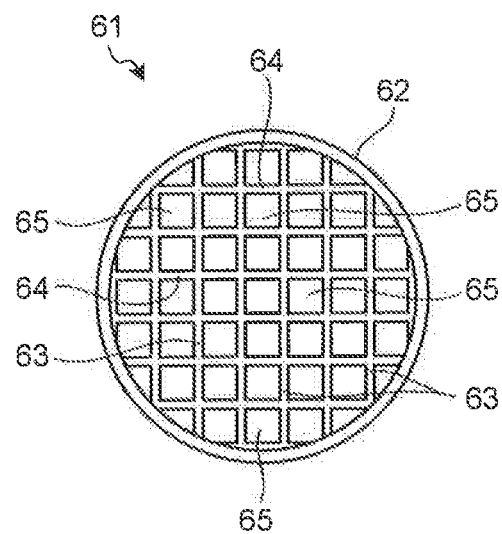
FIG. 5 is a schematic diagram of another modification of the heat exchange unit in the heating device according to the embodiment.

FIG. 1 is a schematic configuration diagram of a geothermal power-generation system according to an embodiment of the present invention, FIG. 2 is a schematic diagram of a bent part of a compressed air piping in the geothermal power-generation system according to the present embodiment, and FIGS. 3, 4, and 5 are schematic diagrams of modifications of a heat exchange unit in a compressed-air heating device according to the present embodiment.

The present embodiment provides a geothermal power-generation system that heats compressed air utilizing geothermal heat and drives and rotates a turbine by the heated compressed air for power generation. As shown in FIG. 1, a geothermal power-generation system 10 according the present embodiment is constituted by a compressor 11, a turbine 12, a generator 13, and a heating device 14. In this case, the compressor 11 and the turbine 12 constitute an air turbine.

In the air turbine, the compressor 11 is connected to the turbine 12 through a turbine shaft 21, and the generator 13 is connected to the turbine shaft 21. Accordingly, when the turbine 12 is driven and rotated, the compressor 11 can be operated and the generator 13 can be driven to generate power.

An air intake piping 31 is connected to the compressor 11, and thus the compressor 11 can compress taken air to a predetermined pressure. A compressed-air supply piping 32 that discharges the compressed air to supply it to the heating device 14 is connected to the compressor 11. A heated-compressed-air supply piping 33 to which the compressed air heated by the heating device 14 is supplied is connected to the turbine 12. The turbine 12 can obtain a rotational force by heated compressed air supplied from the heated-compressed-air supply piping 33. An air discharge piping 34 that discharges used air (heated compressed air with a low pressure and a low temperature) is also connected to the turbine 12, and the air discharge piping 34 is connected to a stack 35. A regenerative heat exchanger 36 that performs heat exchange between compressed air and used air is provided between the compressed-air supply piping 32 and the air discharge piping 34. The generator 13 can generate power by a rotational force inputted from the turbine 12. In the present embodiment, as the compressor 11 compresses air, stable heated compressed air can be supplied to the turbine 12.

A plurality of heating devices 14 are provided for one air turbine (the compressor 11 and the turbine 12) (only two heating devices 14 are shown in FIG. 1), the heating device 14 heats the compressed air compressed by the compressor 11 by geothermal heat, and the compressed-air supply piping 32 and the heated-compressed-air supply piping 33 are connected to the heating device 14. In the present embodiment, while the geothermal power-generation system includes a plurality of heating devices 14, the heating device 14 can be appropriately set as one or plural depending on the specifications for the turbine 12 and the amount of heat recovered from geothermal heat.

As shown in FIGS. 1 and 2, the heating device 14 includes a U-shaped heating piping 41 that is embedded in the around and sealed. The heating piping 41 is bent at a predetermined depth so as to be curved at 180 degrees and reaches the surface of the ground. The heating piping 41 has an air supply pipe 42 that is embedded in the ground to a predetermined depth from the surface of the ground and has a substantially linear shape, a heat exchange unit 43 that is connected to a lower end of the air supply pipe 42 and performs heat exchange between air and geothermal heat, and an air discharge pipe 44 whose lower end is connected to the heat exchange unit 43 and that is embedded in the ground from the surface of the ground.

The heating piping 41 also includes a first heat exchange unit 43a in which the heat exchange unit 43 is connected to a lower end of the air supply pipe 42 and a second heat exchange unit 43b in which the heat exchange unit 43 is connected to a lower end of the air discharge pipe 44. A lower end of the first heat exchange unit 43a is connected to a lower end of the second heat exchange unit 43b by a U-shaped connecting piping 45.

In this case, an area in the ground below the heat exchange unit 43 is a high temperature geological layer that can perform heat-exchange with compressed air. Accordingly, the air supply pipe 42 placed in an area A from the surface of the ground to a first predetermined depth, and the first heat exchange unit 43*a* is placed in an area B from the first predetermined depth to a second predetermined depth. Further, the second heat exchange unit 43*b* is placed in an area D from the second predetermined depth to the first predetermined depth and the air discharge pipe 44 is placed in an area E from the first predetermined depth to the surface of the ground. The connecting piping 45 is placed in an area C that as deeper than the second predetermined depth and connects the first heat exchange unit 43*a* to the second heat exchange unit 43*b*. Because the lowest end of the heating piping 41 is the U-shaped connecting piping 45, the heating piping 41 can be installed by vertically excavating the ground, and thus the hole diameter required for embedding the piping in the ground can be relatively reduced.

The air supply pipe 42 is a cylindrical piping and its upper end is connected to the compressed-air supply piping 32 on the surface of the around or in the ground. The air discharge pipe 44 is a cylindrical piping and its upper end is connected to the heated-compressed-air supply piping 33 on the surface of the ground or in the ground.

Meanwhile, the first heat exchange unit 43*a* and the second heat exchange unit 43*b* that constitute the heat exchange unit 43 have a substantially same configuration and the heat exchange efficiency thereof between air and geothermal heat is higher than that of the air supply pipe 42 and the air discharge pipe 44. That is, as shown in FIG. 3, the first heat exchange unit 43*a* and the second heat exchange unit 43*b* are constituted by a large number of thin tubes 46 that connect the air supply pipe 42 to the connecting piping 45 and connect the air discharge pipe 44 to the connecting piping 45.

The configuration of the heat exchange unit 43 (the first heat exchange unit 43*a* and the second heat exchange unit 43*b*) is not limited to the above configuration. That is, as shown in FIG. 4, a heat exchange unit 51 is constituted by forming a large number of fine pores 53 in a columnar main body 52. As shown in FIG. 5, a heat exchange unit 61 is constituted by forming a large number of fine pores 65 within a columnar main body 62 by partition walls 63 and 64, which are perpendicular to each other.

As shown in FIGS. 1 and 2, in the heating piping 41, a heat insulating unit is provided between the air supply pipe 42 and the air discharge pipe 44. Specifically, the air supply pipe 42 and the air discharge pipe 44 are placed in the ground so as to be spaced away from each other by a predetermined distance, so that geological layers serve as a heat insulating unit. A heat retaining unit 47 is provided at outside of the air discharge pipe 44. Therefore, when compressed air heated by the heat exchange unit 43 (the first heat exchange unit 43*a* and the second heat exchange unit 43*b*) passes through the air discharge pipe 44, the compressed air is not cooled by outer geological layers. A heat retaining unit (not shown) is provided also to outside of the heated-compressed-air supply piping 33 that is connected to the air discharge pipe 44.

An operation of the geothermal power-generation system according to the present embodiment is explained below.

The compressor 11 compresses air taken from the intake piping 31 to a predetermined pressure and supplies the compressed air to the heating device 14 through the compressed-air supply piping 32. When the compressed air is supplied from the compressed-air supply piping 32 to the air supply pipe 42 in the heating device 14, the compressed air passes through the air supply pipe 42 to reach the first heat exchange unit 43*a* and then through the connecting piping 45 to reach the second heat exchange unit 43*b*. In the first heat exchange unit 43*a* and the second heat exchange unit 43*b* serving as the heat exchange unit 43, when the compressed air passes through the large number of thin tubes 46, the compressed air performs heat exchange with heat held by geological layers to be heated to a predetermined temperature.

When passing through the first heat exchange unit 43*a*, the compressed air is efficiently heated and its temperature is increased. The compressed air then passes through the contacting piping 45 to reach the second heat exchange unit 43*b*. When passing through the second heat exchange unit 43*b*, the compressed air is efficiently heated and its temperature is increased. Because the temperature of geological layers is gradually increased while the compressed air passes through the air supply pipe 42 to reach the first heat exchange unit 43*a*, the compressed air is heated and its temperature is increased even when the compressed air is passing through the air supply pipe 42.

The compressed air heated to a predetermined temperature is returned to the surface of the ground through the air discharge pipe 44. Because the heat retaining unit 47 is provided at outside of the air discharge pipe 44, the heated compressed air is not cooled by outer geological layers.

The heated compressed air discharged from the heating device 14 passes through the heated-compressed-air supply piping 33 to be supplied to the turbine 12. The turbine 12 obtains a rotational force by the heated compressed air to be driven and rotated. The generator 13 can generate power by the rotational force inputted from the turbine 12.

The turbine 12 discharges used air utilized to drive and rotate the turbine 12 from the air discharge piping 34, and the used air is processed by the stack 35 and then released to the atmosphere. In the regenerative heat exchanger 36, the compressed air that passes through the compressed-air supply piping 32 heat-exchanges with the used air in the turbine 12 that passes through the air discharge piping 34, so that the compressed air is heated.

As explained above, in the geothermal power-generation system according to the present embodiment, the compressor 11 that compresses air, the heating device 14 that heats compressed air compressed by the compressor 11 by geothermal heat, the turbine 12 that obtains a rotational force by heated compressed air heated by the heating device 14, and the generator 13 that generates power by a rotational force inputted from the turbine 12 are provided.

Accordingly, compressed air compressed by the compressor 11 is heated by the heating device 14 using geothermal heat and the heated compressed air is then supplied to the turbine 12, thereby obtaining a rotational force. The generator 13 generates power by the rotational force inputted from the turbine 12. That is, by using air as an operating fluid, processing facilities for an operating fluid before and after it is used are not required, the piping is hardly deteriorated, and thus facility costs can be reduced.

In the geothermal power-generation system according to the present embodiment, the air supply pipe 42 embedded in the ground to a predetermined depth from the surface of the ground, the heat exchange unit 43 that is connected to a distal end of the air supply pipe 42 to perform heat exchange between air and geothermal heat, and the air discharge pipe 44 that is connected to the heat exchange unit 43 and embedded in the ground from the surface of the ground are provided as the heating device 14. Accordingly, air passes through the air supply pipe 42 to be supplied to the heat exchange unit 43 and heat exchange is performed between the air and geothermal heat, so that heated air is generated. The heated air passes through the air discharge pipe 44 to be returned to the surface of the ground, and therefore heated air can be generated by a simple configuration.

In the geothermal power-generation system according to the present embodiment, a heat insulating unit is provided between the air supply pipe 42 and the air discharge pipe 44. In this case, the air supply pipe 42 and the air discharge pipe 44 are placed in the ground so as to be spaced away from each other by a predetermined distance, so that geological layers are interposed therebetween. Accordingly, by preventing heat exchange between heated air that passes through the air discharge pipe 44 to be returned to the surface of the ground and air that passes through the air supply pipe 42 to be supplied in the ground, heated air with an appropriate temperature can be supplied to the surface of the ground. Further, heat insulation can be realized between the air supply pipe 42 and the air discharge pipe 44 without providing any other components.

Further, in the geothermal power-generation system according to the present embodiment, the heat retaining unit 47 is provided at outside of the air discharge pipe 44. Therefore, heated air heated by the heat exchange unit 43 passes through the air discharge pipe 44 heat-retained by the heat retaining unit 47 to be supplied to the surface of the ground. Accordingly, a decrease in the temperature of the heated air can be prevented and thus heated air with an appropriate temperature can be maintained.

In the geothermal power-generation system according to the present embodiment, the heat exchange unit 43 is constituted by the first heat exchange unit 43a connected to a lower end oil the air supply pipe 42 and the second heat exchange unit 43b connected to a lower end of the air discharge pipe 44. A lower end of the first heat exchange unit 43a is connected to a lower end of the second heat exchange unit 43b by the U-shaped connecting piping 45. Accordingly, the heat exchange units 43a and 43b can be formed in a linear portion, and thus the configuration can be simplified and manufacturing costs and installation costs can be reduced.

While the first heat exchange unit 43a is connected to the second heat exchange unit 43b by the U-shaped connecting piping 45 in the embodiment described above, the connecting piping 45 can be a third heat exchange unit. In this case, the third heat exchange unit is desirably provided while the first heat exchange unit 43a and the second heat exchange unit 43b are a linear connecting piping.

Further, when the geothermal power generation system 10 according to the present embodiment is activated, it is activated by an device such as a separately provided motor to operate a compressor.

In the geothermal power-generation system according to the present embodiment, heat exchange is performed between compressed air that passes through the compressed-air supply piping 32 and used air in the turbine 12 that passes through the air discharge piping 34 in the regenerative heat exchanger 36, so that the compressed air is heated. According to another aspect of the present embodiment; however, as long as it is designed that a sufficient thermal energy is obtained in the heating device 14, exhaust gas from the turbine 12 can be discharged from the air discharge piping 34 without passing through the regenerative heat exchanger, processed by the stack 35, and released to the atmosphere. With this configuration, facility costs can be reduced and facilities with a smaller capacity can be realized.

INDUSTRIAL APPLICABILITY

In the geothermal power-generation system according to the present invention, compressed air is heated by geothermal heat and sent to a turbine for power generation, so that facility costs can be reduced, and the geothermal power-generation system can be applied to any geothermal power-generation systems using geothermal heat.

REFERENCE SIGNS LIST

10 geothermal power-generation system
11 compressor
12 turbine
13 generator
14 heating device
42 supply pipe
43, 51, 61 heat exchange unit
44 air discharge pipe
45 connecting piping
47 heat retaining unit

The invention claimed is:

1. A geothermal power-generation system comprising:
a compressor that compresses air;
an air supply pipe embedded in a ground to a predetermined depth from a surface of the ground;
a heat exchange unit that is connected to a distal end of the air supply pipe and performs heat exchange between air and geothermal heat;
an air discharge pipe that is connected to the heat exchange unit and embedded in the ground from the surface of the ground;
a turbine that obtains a rotational force by heated compressed air heat exchanged by the heat exchange unit; and
a generator that generates power by a rotational force inputted from the turbine, wherein the heat exchange unit includes a columnar main body and a plurality of partition walls for defining a plurality of fine pores within the columnar main body,
wherein the heat exchange unit includes a first heat exchange unit that is connected to a lower end of the air supply pipe and a second heat exchange unit that is connected to a lower end of the air discharge pipe, and the lower end of the first heat exchange unit is connected to the lower end of the second heat exchange unit by a U-shaped connecting piping.

2. The geothermal power-generation system of claim 1, wherein the air supply pipe and the air discharge pipe are placed in the ground so as to be spaced away from each other.

3. The geothermal power-generation system of claim 1 wherein a heat retaining unit is provided at outside of the air discharge pipe.

4. The geothermal power-generation system of claim 1, wherein the system is configured such that the geothermal heat is conducted to an inner portion of the heat exchange unit via the plurality of partition walls.

5. The geothermal power-generation system of claim 1, wherein the plurality of partition walls are connected to the columnar main body.

* * * * *